(12) United States Patent
Dahlerud

(10) Patent No.: US 6,204,987 B1
(45) Date of Patent: Mar. 20, 2001

(54) METHOD FOR LOADING DATA ON A TAPE AT A CENTER OF THE TAPE, AND A TAPE FOR IMPLEMENTING THE METHOD

(75) Inventor: Ole Christian Dahlerud, Oslo (NO)

(73) Assignee: Tandberg Data ASA, Oslo (NO)

( * ) Notice: Subject to any disclaimer, the term of this patent is extended or adjusted under 35 U.S.C. 154(b) by 0 days.

(21) Appl. No.: 09/103,769

(22) Filed: Jun. 24, 1998

(51) Int. Cl.⁷ ................................................. G11B 15/44
(52) U.S. Cl. ........................................ 360/74.6; 360/72.3
(58) Field of Search ................................. 360/74.6, 72.1, 360/72.2, 72.3, 74.1, 74.4, 74.5, 78.02

(56) References Cited

U.S. PATENT DOCUMENTS

| | | | |
|---|---|---|---|
| 2,670,212 | * | 2/1954 | Heller et al. ................... 360/74.4 X |
| 5,293,280 | * | 3/1994 | Ishikawa et al. .................. 360/74.1 |
| 5,485,321 | * | 1/1996 | Leonhardt et al. ............. 360/72.2 X |
| 5,572,378 | * | 11/1996 | Schwarz et al. ............... 360/74.4 X |
| 5,757,571 | * | 5/1998 | Basham et al. ................ 360/74.4 X |
| 5,959,800 | * | 9/1999 | Hartung et al. ................... 360/74.4 |
| 6,031,698 | * | 2/2000 | Bar ................................ 360/72.2 X |

* cited by examiner

Primary Examiner—W. R. Young
Assistant Examiner—James L Habermehl
(74) Attorney, Agent, or Firm—Schiff Hardin & Waite

(57) ABSTRACT

In a method for writing data on a data carrier tape, a central region of the tape is positioned adjacent a data recording head, data are supplied to the data recording head, and data are transferred from the data recording head to the tape, beginning at the center region of the tape, while moving the tape along a longitudinal direction of the tape. The tape transport direction can be alternatingly reversed at the opposite ends of the tape so data are recorded successively on adjacent data recording tracks on the tape, with data transfer being inhibited each time the center region of the tape passes by the data recording head. A data carrier tape for implementing the method has a hole pattern in the central region of the tape, which identifies the central region of the tape to allow positioning of the tape at the central region, and to allow recognition of the central region for inhibiting data transfer when the central region of the tape is adjacent the data recording head.

8 Claims, 1 Drawing Sheet

US 6,204,987 B1

METHOD FOR LOADING DATA ON A TAPE AT A CENTER OF THE TAPE, AND A TAPE FOR IMPLEMENTING THE METHOD

BACKGROUND OF THE INVENTION

1. Field of the Invention

The present invention is directed to a method for loading data on a tape, such as a magnetic tape, as well as to a tape for implementing the method, such as a tape having a hole pattern therein.

2. Description of the Prior Art

It is known to write data on a strip-like data carrier, such as a magnetic tape, in a controlled sequence and at controlled locations on the tape by the execution of a bit output program. Typically, data are written in a number of parallel tracks on the tape, the tracks proceeding parallel to the tape transport direction, which is along the longitudinal (longest) direction of the tape. The tape can be transported bidirectionally during the execution of the bit output program so that the data can be written on the tape from one end to the other, while the tape is moving in a first direction, and then the tape movement direction is reversed so that data are written in a parallel track while the tape moves from the second end back to the first end. The first end is usually referred to as the "beginning of tape", or BOT, and the opposite end is referred to as the "end of tape", or EOT.

During the execution of the bit output program, the tape is moved extremely fast, and therefore the tape transport system must have some way of recognizing BOT and EOT, as well as having some kind of indication when either BOT or EOT is approaching. For this purpose, a standardized system of tape holes or tape hole patterns has been devised, which is employed in high speed data reading and writing systems. Accordingly, a BOT marker is provided at one end of a conventional tape, which consists of several pairs, often four pairs, of holes which are spaced along the longitudinal direction of the tape, near the physical beginning edge of the tape. The holes in each pair are substantially vertically aligned in a direction perpendicular to the longitudinal direction. The pairs of holes are respectively designated with numbers, so that if four such pairs are employed, they will be designated BOT1, BOT2, BOT3 and BOT4.

The tape drive is provided with a light barrier system, i.e., a light emitter and a light receiver, so that as the tape passes between the light emitter and light receiver, the presence of the holes is noted and the drive is controlled accordingly.

The tape is also typically provided with a tape identification (tape ID) and/or cartridge identification (cartridge ID) hole pattern between BOT1 and BOT2. This hole pattern provides identification regarding the tape or cartridge itself, such as file information, information about the data to be stored thereon, identification of the tape manufacturer or tape type, or identification regarding a drive or drives with which the tape or cartridge is compatible.

According to the standard, the beginning of tape hole pair designated BOT1 will be the farthest from the physical beginning edge of the tape, and BOT4 will be closest to the physical edge. At some point proceeding in a direction away from the physical beginning of the tape, beyond BOT1, a load point (LP) marker hole will be provided, which is a single hole in the tape that indicates the start of the useable recording area when the tape transport motion is in the direction conventionally designated as the "forward" direction. Data are stored on the tape magnetically only after the load point marker is traversed.

At the opposite end of the tape, a series of single holes is provided in the tape to indicate the end of the tape. These single holes will usually be spaced from the longitudinal edge of the tape at the same distance as one of the holes in the hole pairs identifying the beginning of the tape. If four such end of tape identifiers or markers are employed, they will be designated EOT1, EOT2, EOT3 and EOT4, with EOT4 being closest to the physical end of the tape and EOT1 being farthest from the physical end of the tape. Preceding EOT1, at some point farther from the physical end of the tape than EOT1, is an early warning (EW) marker, which is a hole disposed at approximately the same location from the longitudinal edge of the tape as the load point marker. This hole provides an early indication to the drive of the approaching end of the tape, and is usually the point where writing of data onto the tape ceases when the tape is moving in the forward direction.

For bidirectional loading of data onto a tape, wherein the tape moves rapidly back and forth between the (arbitrarily) designated beginning of tape and end of tape, when the tape moves in a direction opposite to the arbitrarily designated "forward" direction, the early warning marker can then serve as the load point marker to begin loading of data when the tape is moving opposite the forward direction, and the aforementioned load point marker can then serve as the early warning marker to indicate the approaching beginning of the tape and the necessity of undertaking a direction reversal.

In conventional loading systems, as noted above, data loading takes place by starting with a data track, typically near the longitudinal edge of the tape, at the point at which the LP marker after BOT1 is reached, and the tape is transported in the "forward" direction until data loading stops at the early warning point, whereupon a reversal of the tape transport direction takes place and data are then loaded on a parallel track, typically adjacent to the just-written track, as the tape moves back in the opposite direction. Data loading then ceases when the load point marker preceding BOT1 is reached, and a direction reversal again takes place. This sequence is repeated until all tracks on the tape are filled, or until no more data are available for writing onto the tape.

If all of the data stored on a tape are to be read therefrom, the same procedure is repeated with the magnetic head operating in a read mode, rather than a write mode. If only a portion of the data are to be read, or if designated data are to be read, a search program can be undertaken to try to position the tape as quickly as possible to read the desired data without having to sequence through the entirety of the data stored on the tape. Depending on where the tape happens to be positioned on the spools along its longitudinal length, however, a considerable length of tape may have to be traversed before the location is reached at which the desired data are stored. For example, if the tape at the conclusion of a preceding operation happens to be positioned so that a part of the tape close to the beginning of the tape is adjacent the read/write head, but data are desired to be read which are located near the end of the tape, the tape must be transported through virtually its entire length before the data can be accessed. If this occurs multiple times during multiple data access operations, this can result in considerable delays in gaining access to the data, and moreover requires that the tape and tape transport system be operated at a high speed during which no direct benefit is being obtained, i.e., no data are being read.

SUMMARY OF THE INVENTION

It is an object of the present invention to provide a method for writing data on a tape-like data carrier, such as a magnetic tape, which allows more rapid access to the recorded data than conventional data writing methods.

It is a further object of the present invention to provide a tape on which data can be written in a manner which provides more rapid access to the data on the tape than is the case for conventional tapes.

The above object is achieved in accordance with the principles of the present invention in a method for writing data on a data carrier tape wherein the writing of data begins at a location at the center of the tape, and proceeds along tracks in "forward" and "reverse" directions between the center of the tape and the conventionally designated beginning of tape and end of tape.

The above object is also achieved in a data carrier tape, such as a magnetic tape, having an appropriate hole pattern arrangement disposed along a length of a tape at the center of the tape, for providing the necessary commands and indicators to a conventional optical reader system in a drive, so as to allow the aforementioned inventive method to be implemented.

As used herein, the term "center" or "center of the tape" does not necessarily mean the exact geometric center of the tape between the physical tape beginning and the physical tape end. The terms "center" and "center of tape" as used herein refer to a region which is generally located approximately midway between the hole patterns which are conventionally present at the beginning of the tape and the end of the tape, i.e., approximately in a middle region of the data-recording region of the data carrier tape. As will be apparent from the discussion below, the time-saving advantages for access to the data stored on the tape are maximized when the region designated as "center of the tape" encompasses the geometrical center or midpoint of the tape, however, time-saving advantages can still be obtained if the region designated "center of the tape" is arbitrarily selected at any location which is spaced a significant distance from the physical ends of the data carrier tape.

The access time for reading data stored on a tape, on which the data are recorded in accordance with the inventive method, can be even further improved in an embodiment of the method wherein the data-recording regions on opposite sides of the location designated as the center of the tape (i.e., the region between the designated center of tape region and the beginning of tape region, and the region between the designated center of tape region and the end of tape region), are further divided into data recording sections. Within each data recording section, the tape is bidirectionally transported while data are written on all parallel tracks in that section, and only after the data tracks for a given section are completely filled does data recording then move to another section. Since the sections occupy comparatively shorter lengths of the overall data carrier tape length, a data search can be conducted within each section very quickly, compared to searching or moving along the entire tape, as well as compared to searching or moving within only one-half of the tape length.

In a data carrier tape designed for implementing the inventive method, a series of hole pairs, similar to those conventionally used at the beginning of the tape, are punched in the tape, in order to allow the optical system in the tape drive to identify the region which has been designated as the center of the tape, in order to initiate appropriate control commands for operating the drive. A hole pattern representing a tape ID or cartridge ID is disposed between two of the pairs of the center of tape marker holes. On one side of the last of the center of tape marker hole pairs, a hole is punched in the tape designating a load point, following which data can be recorded onto the data carrier tape. At the opposite side of the center of tape markers, and spaced therefrom, an early warning hole is provided. Since data recording on the tape constructed in accordance with the invention is necessarily accomplished bidirectionally, the designation of these outlying holes as a load point marker and an early warning marker, respectively, is somewhat arbitrary because depending on the tape transport direction, the early warning marker can serve as a load point marker, and the load point marker can serve as an early warning marker.

In an embodiment of the tape employing four pairs of center of tape marker holes, the total length of the tape occupied between the early warning marker and the load point marker associated with the center of the tape markers is 196 inches. In an embodiment wherein more data carrier tape area is made available for data recording, only two pairs of center of tape marker holes are employed, with a tape or cartridge ID hole pattern therebetween, and an early warning marker hole on an opposite side of one center of tape marker pair, and a load point marker hole on an opposite side of the other center of tape marker pair. In this embodiment, the tape length between the early warning marker and the load point marker is only 24 inches, thereby freeing a considerable area of the data carrier tape for data recording.

DESCRIPTION OF THE PREFERRED EMBODIMENTS

Figure 1:
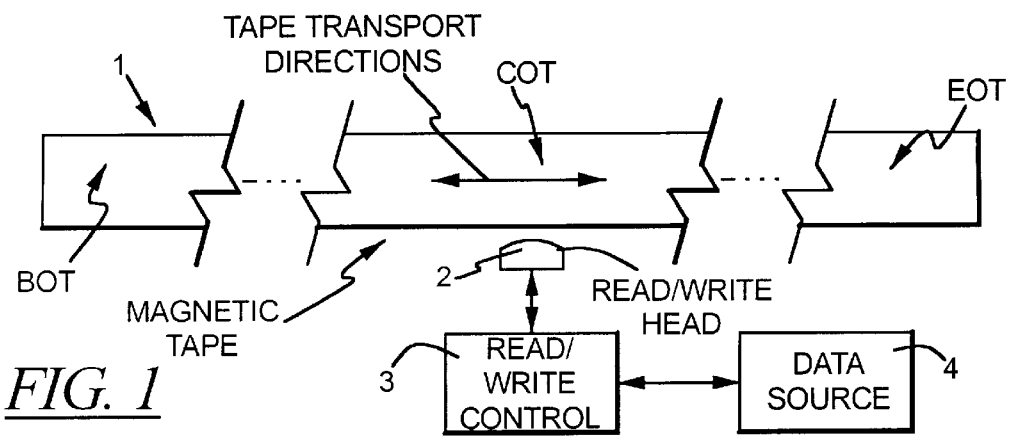
FIG. 1 is a schematic block diagram showing an apparatus for conducting the inventive method for writing data onto a data carrier tape, as well as for reading data from the data carrier tape.

FIG. 1 schematically illustrates an arrangement for reading and writing data (transferring data) to and from a tape-like data carrier. The apparatus (except for the tape) is conventional in structure, but it is operated unconventionally, in accordance with the principles of the inventive method.

The tape-like data carrier is shown in the embodiment of FIG. 1 as being a magnetic tape 1, however, the inventive method can be employed in any type of elongated, tape-like data carrier. The magnetic tape 1 has opposite physical ends, with a region adjacent one of those physical ends being designated as the beginning of tape region BOT, and a region adjacent the opposite physical end of the tape 1 being designated as the end of tape region EOT. The region BOT and the region EOT respectively contain conventional hole patterns of the type described above.

The magnetic tape 1 also has a region designated as the center of tape region COT. This region can be arbitrarily located at any significant distance between the BOT region and the EOT region, however, as described below the reduction in access to data time is maximized in accordance with the inventive method if the COT region encompasses the geometrical center or midpoint of the magnetic tape 1. The magnetic tape 1 is moved in a conventional manner by a conventional tape drive system in opposite tape transport directions, as indicated by the double arrow.

Data transfer takes place relative to the magnetic tape 1 by means of a read/write head 2, which is connected to a read/write control 3. Data to be written on the magnetic tape 1 are supplied from a data source for, and data read from the magnetic tape 1 can be supplied to the data source 4 for storage therein, or to some other location for some other purpose.

Figure 2:
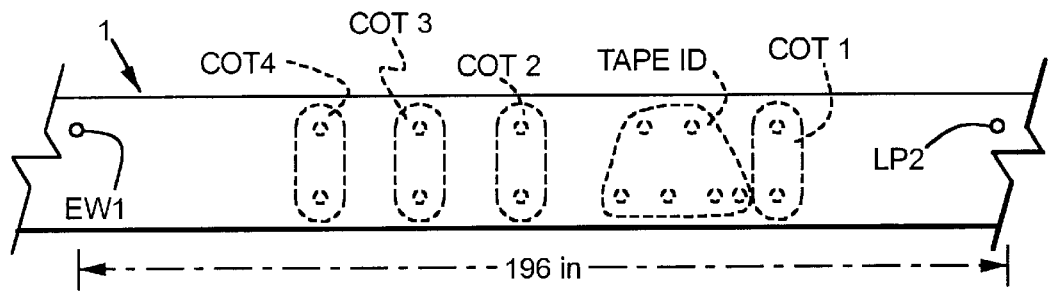
FIG. 2 shows a portion of a first embodiment of a data carrier tape constructed in accordance with the principles of the present invention.

The center of tape region COT for a first embodiment of a magnetic tape 1 for implementing the inventive method is shown in FIG. 2. This embodiment employs four pairs of center of tape marker holes, COT1, COT2, COT3 and COT4. A tape ID hole pattern is disposed between two of these center of tape marker pairs, such as between COT1 and COT2. The pattern of the tape ID informs the drive that the tape, or tape cartridge, is of a type for which a loading from center procedure should be implemented. An identical tape ID can be disposed at the conventional locations at the BOT region and EOT region so that if the tape at the beginning of a read or write operation is located with the BOT region or the EOT region adjacent the read/write head, the drive will be informed that the tape should be advanced or reversed until the center of tape region COT is in front of the read/write head 2, before beginning the read or write procedure. Less preferably, there could simply be no tape ID hole pattern at either the BOT region or the EOT region, and if the drive then recognizes a BOT region without a tape ID pattern or an EOT region without a tape ID pattern, the drive then "defaults" to cause the tape to be moved to position the COT region in front of the read/write head 2.

As can be seen in FIG. 2, the hole pairs COT1 through COT4 resemble the conventional hole pairs used to designate BOT. If the distance between the tape holes and the number of holes in FIG. 2 are maintained exactly as in conventional tapes for the BOT designation, the total distance of the conventional BOT designation area is 136 inches. This would then also be the total distance between COT4 and a new loading point marker hole LP2, which identifies the location at which data recording can start following identification of the center of the tape. In conventional tapes, the early warning hole is placed 60 inches in front of the first-encountered BOT hole pair or the last-encountered EOT hole. If this conventional distance is adhered to in the embodiment of FIG. 2, this means the total distance between the new early warning hole EW1 and the new loading point marker hole LP2, will be a total of 196 inches, or 16.33 feet. On a conventional tape, this area would normally be available for data recording. For a tape having a longitudinal length of 1500 feet, the capacity loss will therefore be (16.33/1500)·100%=1.09%.

The length of the hole patterns in the COT region, however, can be made much shorter than conventional pattern arrangements, because at that location on the tape there is no risk of running out of tape, i.e., inadvertently reaching the physical edge of the tape. The minimum length of the COT region will be determined primarily by how quickly and accurately the drive for which the tape is intended to be used can stop between the COT hole pairs which are present. There are commercial drives available which, if being operated at 30 ips, require approximately 4 inches to stop. Moreover, the distance between COT1 and LP2 can be set extremely small, or may even be 0. The distance from EW1 to the closest center of tape hole pair must be maintained large enough to allow proper termination of the recording, once EW1 is traversed and recognized. In most drives, a distance of 4 inches will be enough to allow for proper termination of the recording.

Figure 3:
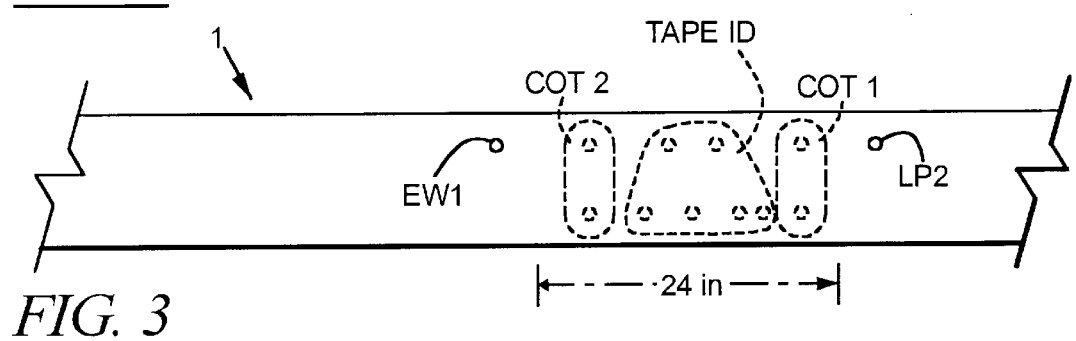
FIG. 3 shows a portion of a second embodiment of a data carrier tape constructed in accordance with the principles of the present invention.

The embodiment of FIG. 3 shows a tape drive for implementing the inventive method which embodies the above considerations. In this embodiment, only two center of tape marker pairs COT1 and COT2 are provided, and the total length of the marker hole region at the center of the tape is thereby reduced to approximately 24 inches, or 2 feet. The capacity loss is then only 0.13%.

Figure 4:
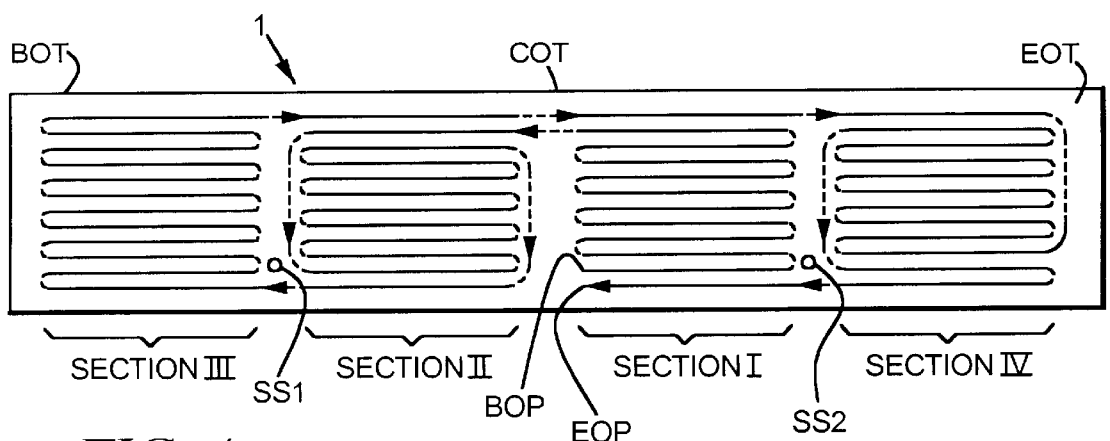
FIG. 4 schematically illustrates one embodiment of conducting the method of the invention wherein data are recorded in sections on the data carrier tape.

One embodiment for conducting the inventive method is shown in FIG. 4. Before beginning a data writing operation, i.e., at a beginning of the execution of the bit output program, the tape 1 is positioned with the COT region in front of the read/write head 2, as described above. The bit output program then begins at location BOP (beginning of program) as shown in FIG. 4. The magnetic tape is repeatedly advanced and reversed in the direction of the arrows while only a relatively small longitudinal section of the tape is filled with data in adjacent, parallel tracks. This section in FIG. 4 is arbitrarily designated as section I. The BOP location will preferably be at a beginning of the penultimate bottom track (i.e., one recording track above the bottommost track in the section). After filling the penultimate data track (i.e., the data track immediately adjacent and below the uppermost data track) in section I, the drive recognizes that this has occurred, by counting the number of tracks that had been filled, and repositions the tape 1 so that the read/write head is able to enter data into another section, arbitrarily designated section II. Since the tape 1 is merely moved without vertically repositioning the read/write head 2, section II begins to be filled with the penultimate upper data track, and after the penultimate upper data track in section II is filled with data, the read/write head 2 is moved downwardly by a number of track heights (widths) to the track immediately above the bottommost track (the penultimate bottom track) in section II. All tracks in section II between the penultimate bottom track and the penultimate upper track are then filled while the tape 1 is alternatingly moved backward and forward. When the track immediately below the penultimate upper track in section II is filled, the read/write head 2 is moved downwardly to enter data into the bottommost track in section II, and at the end of that track in section II, the drive moves the tape 1 so that a new section, arbitrarily designated as section III, is filled, beginning with the bottommost track therein. Section III is filled with the tape 1 being alternatingly moved backward and forward, until all tracks in section III are filled with data, whereupon the drive moves the tape 1 so that the uppermost track in section II is filled, and then moves the tape again so that the uppermost tracks in each of sections I and section IV are filled. Upon reaching the end of the uppermost track in section IV, the read/write head 2 is vertically positioned downwardly to the track in section IV which is two tracks away from the bottommost track in section IV. The drive alternatingly moves the magnetic tape 1 back and forth until the penultimate upper track in section IV is filled, whereupon the read/write head 2 is moved downwardly to the penultimate bottom track in section IV (which is immediately above the bottommost track) in section IV, and that track and the bottommost track in section IV are filled.

The tape is then moved to fill the bottommost track in section I, at which point the end of program EOP is reached.

The respective longitudinal lengths of the sections can be set by programming a specific number of bits per row in the bit output program so that when that number of bits is reached, an automatic tape transport direction reversal takes place. The respective longitudinal lengths of the sections need not be equal, but the maximum advantage of the inventive method will be achieved if all of the longitudinal lengths of the respective sections are equal.

Of course, the method can be implemented with any number of sections, with a minimum of two sections, one on each side of the COT region, i.e., one region completely filling the region between the COT region and the BOT region, and another region completely filling the region between the COT region and the EOT region.

Vertical movement of the read/write head in a controlled manner can be accomplished by any conventional head stepping mechanism and control apparatus therefor.

More than four sections can be employed in the inventive method, however, it is apparent that the gain in access time, which results from smaller data sections which must be searched or traversed in order to gain access to predetermined data, is offset to a certain extent because the writing time will be slightly increased by the increased number of tape direction reversals and vertical head movements.

It is also possible to control the splitting of the sections by means of additional holes punched in the tape 1, such as a section split hole SS1 between sections III and II, and a section split hole SS2 between sections I and IV. The holes SS1 and SS2 will be recognized by the optical system of the drive, and will then control the reversal of the tape transport direction when encountered. Moreover, in order to allow completely unrestricted write sequencing, a track ID has to be added at the start of each of the new sections. These track IDs can be written as part of the bit output program at the beginning of each section.

As noted above, dependent on the longitudinal length of the COT region, and the number of sections. In the embodiment of the inventive method wherein only two data recording sections are employed, one between the COT region and the BOT region and the other between the COT region and the EOT region, all tracks will be filled from BOT to EOT or vice versa, except for the first track will start at the COT region and the last track which will end at the COT region. There is, as noted above, an interruption in the data writing as the COT region is traversed. For the embodiment of FIG. 2 wherein the COT region has a longitudinal length of 196 inches, each traversal of the COT region requires 1.67 seconds at a conventional tape transport speed and each track is traversed in a total time of 150 seconds. This would result in an increased time of 1.11% to fill the entire tape with data, compared to a conventional writing procedure wherein writing proceeds uninterruptedly from BOT to EOT. In the embodiment of FIG. 3, wherein the COT region occupies only 24 inches, the time to traverse this region is reduced to 0.23 seconds, and the increased time is then only 0.15%.

In the embodiment of the method illustrated in FIG. 4, wherein data are written in four sections on the tape 1, it is estimated that the time to fill the entire tape (i.e., all sections) with data will increase by about 2.0%, compared to a conventional tape and a conventional writing method. This assumes, however, that the data are written on the tape 1 in a continuous streaming procedure starting with a blank tape and ending with a completely filled tape. It is more likely that only portions of the tape will be written at a time, perhaps only one section at a time, in which case the increased writing time will be considerably reduced.

The above exemplary embodiments have been described in the context of holes being used for the various markers. It is known in the art to employ other types of markers instead, such as reflective markers or magnetic markers. These add to the complexity of the drive and therefore markers in the form of holes are preferred, however, the inventive method and tape can employ any suitable type of marking arrangement.

Although other modifications and changes may be suggested by those skilled in the art, it is the intention of the inventor to embody within the patent warranted hereon all changes and modifications as reasonably and properly come within the scope of his contribution to the art.

I claim as my invention:

1. A method for writing data on a data carrier tape, comprising the steps of:

providing a data carrier tape having a first end and a second end with a longitudinal direction extending between said first end and said second end and having a central region between said first end and said second end, and having a center region disposed between said first end and said second end;

providing a data recording head;

positioning said central region of said tape adjacent said data recording head;

supplying said data to said data recording head;

dividing said tape along said longitudinal direction into a plurality of data recording sections at least including a first section adjacent a first side of said center region, a second section adjacent a second side, opposite said first side, of said center region, a third section between said first end of said tape and said second section, and a fourth section between said second end of said tape and said first section, each of said plurality of data recording sections having a bottommost data recording track therein and an uppermost data recording track therein, with a plurality of data recording tracks between said bottommost data recording track and said uppermost data recording track including a penultimate bottom track adjacent said bottommost track and a penultimate upper track adjacent said uppermost track;

transferring said data from said data recording head to said tape, beginning at said center region of said tape, while transporting said tape along said longitudinal direction by beginning transferring said data from said data recording head to said tape at a beginning, adjacent said center region of said tape, of said penultimate bottom track in said first section and transferring data successively into the data recording tracks in said first section until filling said penultimate upper track in said first section;

moving said tape through said center region to position said data recording head at a beginning, adjacent said center region of said tape, of said penultimate upper track of said second section and filling said penultimate upper track in said second section;

moving said data recording head in a direction perpendicular to said longitudinal direction to a beginning of said penultimate bottom track in said second section and successively filling said data recording tracks in said second section until reaching an end, adjacent said center region, of a data recording track immediately below and adjacent said penultimate upper track in said second section;

moving said data recording head in said direction substantially perpendicular to said longitudinal direction to a beginning, adjacent said center region of said tape, of said bottommost track in said second section and transferring data from said data recording head to fill said bottommost track in said second section;

after filling said bottommost track in said second section, moving said tape to position said data recording head at a beginning of the bottommost track in said third section;

transferring data from said data recording head to fill all of the data recording tracks, including said uppermost track, of said third section;

after filling said uppermost track in said third section, moving said tape to position said data recording head a beginning, adjacent said third section, of said uppermost track in said second section and filling said uppermost track in said second section;

moving said tape through said center region to position said data recording head at a beginning, adjacent said center region, of the uppermost track in said first section and filling said uppermost track in said first section;

moving said tape to position and data recording head at a beginning, adjacent said first section, of the uppermost track in said fourth section and filling said uppermost track in said fourth section;

after filling said uppermost track in said fourth section, moving said data recording head in said direction perpendicular to said longitudinal direction to a data recording track in said fourth section which is immediately above said penultimate bottom track in said fourth section and filling said track above said penultimate bottom recording track and others of said data recording tracks in said fourth section until filling said penultimate upper track in said fourth section;

moving said data recording head in said direction perpendicular to said longitudinal direction to a beginning, adjacent said first section, of said penultimate bottom track in said fourth section;

filling said penultimate bottom track in said fourth section, and filling said bottommost track in said fourth section; and moving said tape to position said data recording head at a beginning, adjacent said fourth section, of the bottommost track in said first section, and filing said bottommost track in said first section.

2. A method as claimed in claim 1 wherein the step of transferring said data from said data recording head to said tape includes ending the transfer of said data from said data recording head to said tape at said center region of said tape.

3. A method as claimed in claim 1 wherein the step of providing a data carrier tape comprises providing a data carrier tape with a center of tape marker pattern disposed in said central region of said tape, and wherein the step of positioning said center region of said tape adjacent said data recording head comprises moving said tape past said data recording head and recognizing said center of tape marker pattern and stopping movement of said tape upon recognition of said center of tape marker pattern.

4. A method as claimed in claim 3 wherein the step of transferring said data from said data recording head to said tape comprises recognizing said center of tape marker pattern during transfer of said data from said data recording head to said tape and inhibiting transferring said data from said data recording head to said tape in said center region of said tape.

5. A method as claimed in claim 4 wherein the step of transferring said data from said data recording head to said tape includes ending the transfer of said data from said data recording head to said tape at said center region of said tape.

6. A method as claimed in claim 1 wherein the step of providing a data carrier tape comprises providing a data carrier tape having split section markers respectively disposed between each section in said plurality of sections except between said first section and said second section.

7. A method as claimed in claim 1 wherein all of the sections in the plurality of sections have a substantially equal extent in said longitudinal direction of said tape.

8. A method as claimed in claim 1 wherein the step of providing a data carrier tape comprises providing a magnetic data carrier tape, and wherein the step of providing a data recording head comprises providing a magnetically operating data recording head.

\* \* \* \* \*